(12) United States Patent
Cho et al.

(10) Patent No.: US 10,015,308 B2
(45) Date of Patent: Jul. 3, 2018

(54) MOBILE TERMINAL AND METHOD OF CONTROLLING THE SAME

(71) Applicant: LG ELECTRONICS INC., Seoul (KR)

(72) Inventors: Kyungmin Cho, Seoul (KR); Jeonghyun Lee, Seoul (KR); Minah Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 14/300,046

(22) Filed: Jun. 9, 2014

(65) Prior Publication Data

US 2015/0033129 A1    Jan. 29, 2015

Related U.S. Application Data

(60) Provisional application No. 61/858,620, filed on Jul. 26, 2013.

(30) Foreign Application Priority Data

Nov. 15, 2013   (KR) .................. 10-2013-0139281

(51) Int. Cl.
  *G06F 3/16*      (2006.01)
  *H04M 1/725*    (2006.01)
  (Continued)

(52) U.S. Cl.
  CPC ...... *H04M 1/72583* (2013.01); *G06F 3/0488* (2013.01); *G06F 3/04842* (2013.01);
  (Continued)

(58) Field of Classification Search
  USPC .................................. 715/728, 718
  See application file for complete search history.

(56) References Cited

U.S. PATENT DOCUMENTS

| 6,424,357 B1* | 7/2002 | Frulla ............... G06F 3/038 715/716 |
| 2006/0036946 A1* | 2/2006 | Radtke ............ G06F 17/24 715/711 |

(Continued)

FOREIGN PATENT DOCUMENTS

| CN | 1790244 A | 6/2006 |
| CN | 101223497 A | 7/2008 |

(Continued)

OTHER PUBLICATIONS

Joe McManus, Create a Mirror-Image Effect in Final Cut Pro, Nov. 2006, Event DV, vol. 19, 11; p. 30 (Year: 2006).*

(Continued)

*Primary Examiner* — Tam T Tran
(74) *Attorney, Agent, or Firm* — Birch, Stewart, Kolasch & Birch, LLP

(57) ABSTRACT

A mobile terminal including a camera; a display unit configured to display an image input through the camera; and a controller configured to display at least one user-defined icon corresponding to linked image-setting information, receive a touch signal indicating a touch is applied to a corresponding user-defined icon, and control the camera to capture the image based on image-setting information linked to the corresponding user-defined icon in response to the received touch signal.

10 Claims, 21 Drawing Sheets

(51) Int. Cl.
*H04N 5/232* (2006.01)
*G06F 3/0484* (2013.01)
*G06F 3/0488* (2013.01)
*G06F 3/0481* (2013.01)

(52) U.S. Cl.
CPC ........ *G06F 3/167* (2013.01); *H04M 1/72522* (2013.01); *H04N 5/23216* (2013.01); *H04N 5/23293* (2013.01); *G06F 3/04817* (2013.01); *G06F 3/04845* (2013.01); *G06F 3/04847* (2013.01); *H04M 2250/22* (2013.01); *H04M 2250/52* (2013.01); *H04M 2250/74* (2013.01)

(56) References Cited

U.S. PATENT DOCUMENTS

| | | | | |
|---|---|---|---|---|
| 2007/0016872 | A1* | 1/2007 | Cummins | G06F 3/0486 715/769 |
| 2008/0248797 | A1 | 10/2008 | Freeman et al. | |
| 2009/0015703 | A1 | 1/2009 | Kim et al. | |
| 2009/0073285 | A1* | 3/2009 | Terashima | H04N 5/23245 348/231.99 |
| 2011/0035665 | A1* | 2/2011 | Kim | G06F 3/04883 715/702 |
| 2011/0261213 | A1 | 10/2011 | Rottler et al. | |
| 2012/0137236 | A1* | 5/2012 | Abe | G06F 3/0482 715/763 |
| 2013/0010170 | A1 | 1/2013 | Matsuzawa et al. | |
| 2013/0321340 | A1 | 12/2013 | Seo et al. | |
| 2014/0028885 | A1* | 1/2014 | Ma | H04N 5/23216 348/333.01 |
| 2014/0195250 | A1 | 7/2014 | Gustafsson et al. | |
| 2014/0267867 | A1* | 9/2014 | Lee | H04N 5/23293 348/333.01 |

FOREIGN PATENT DOCUMENTS

| | | | |
|---|---|---|---|
| CN | 101388965 | A | 3/2009 |
| CN | 101996038 | A | 3/2011 |
| CN | 102811306 | A | 12/2012 |
| EP | 2674834 | A2 | 12/2013 |
| JP | 2004-363935 | A | 12/2004 |
| JP | 2008-5248 | A | 1/2008 |
| JP | 2009-100316 | A | 5/2009 |
| JP | 2009-543396 | A | 12/2009 |
| JP | 2013-54756 | A | 3/2013 |
| JP | 2013-90056 | A | 5/2013 |
| JP | 2013-92952 | A | 5/2013 |
| JP | 5214051 | B1 | 6/2013 |
| WO | WO 2012/108668 | A2 | 8/2012 |
| WO | WO 2014/018307 | A1 | 1/2014 |

OTHER PUBLICATIONS

Jim Heid, Image Editing beyond iPhoto, Jan. 2005, Macworld, col. 22, 1, p. 78 (Year: 2005).*

* cited by examiner

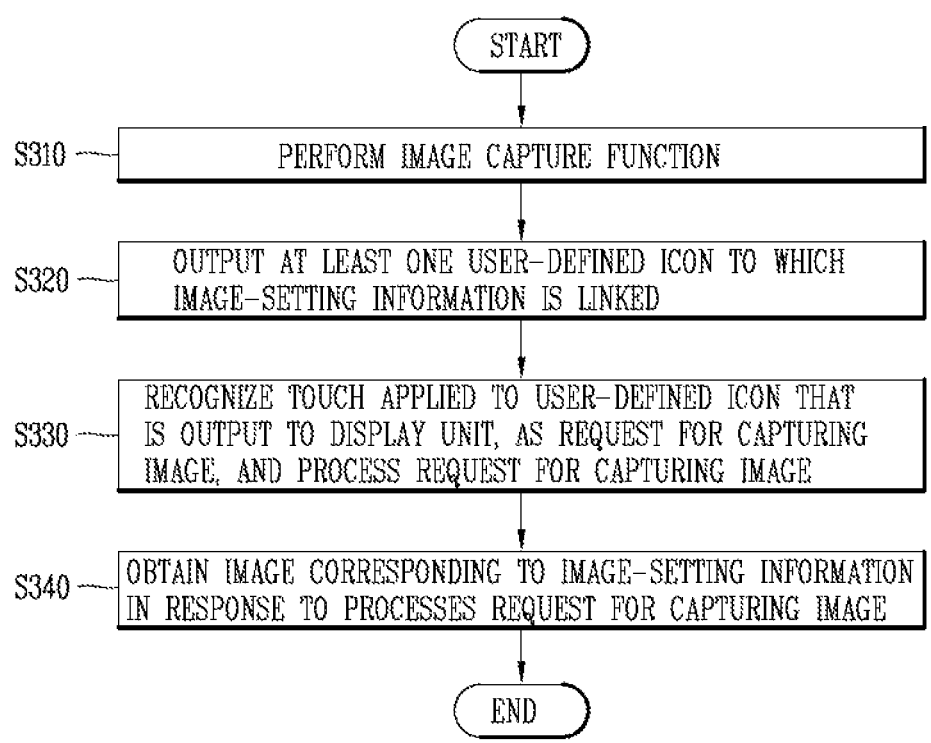

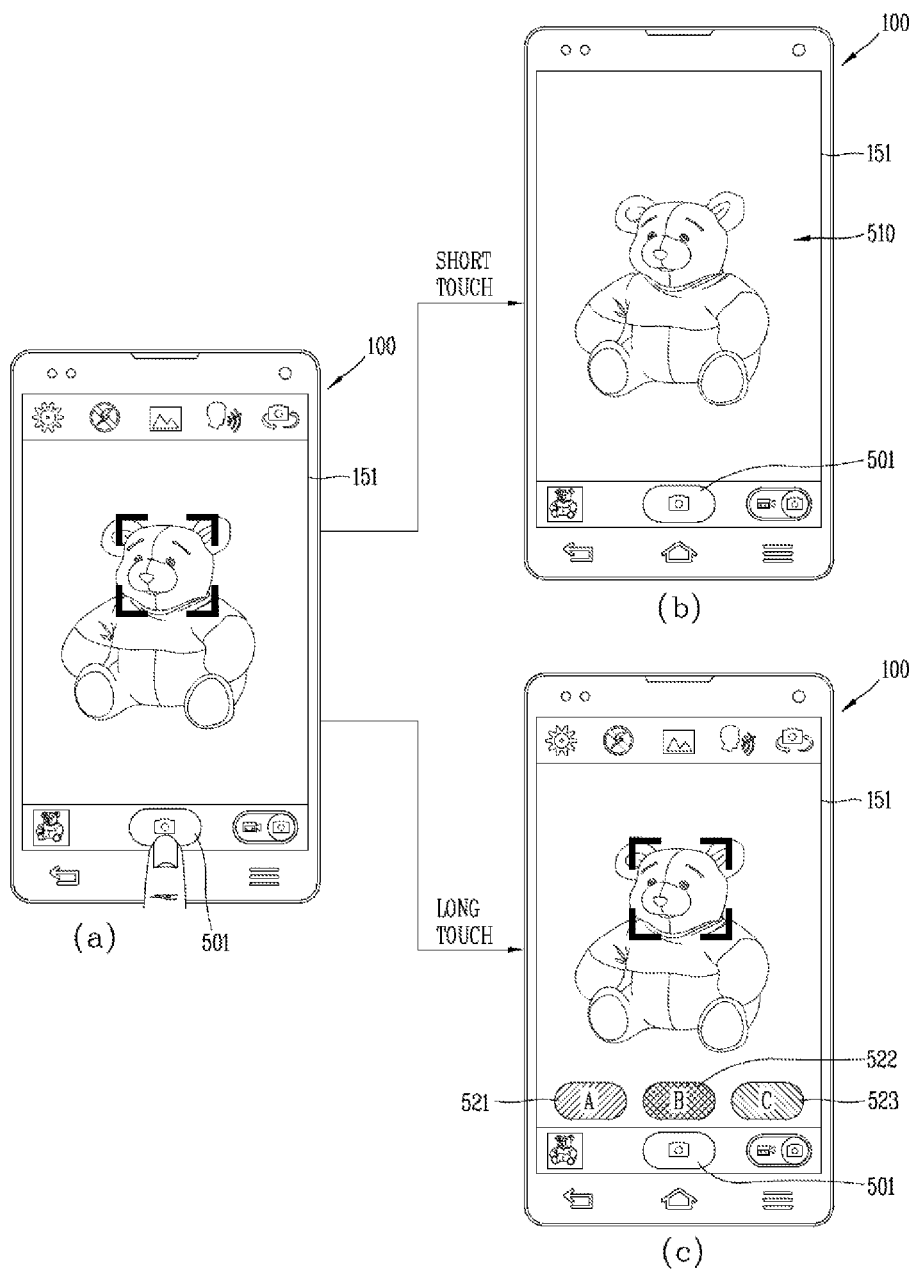

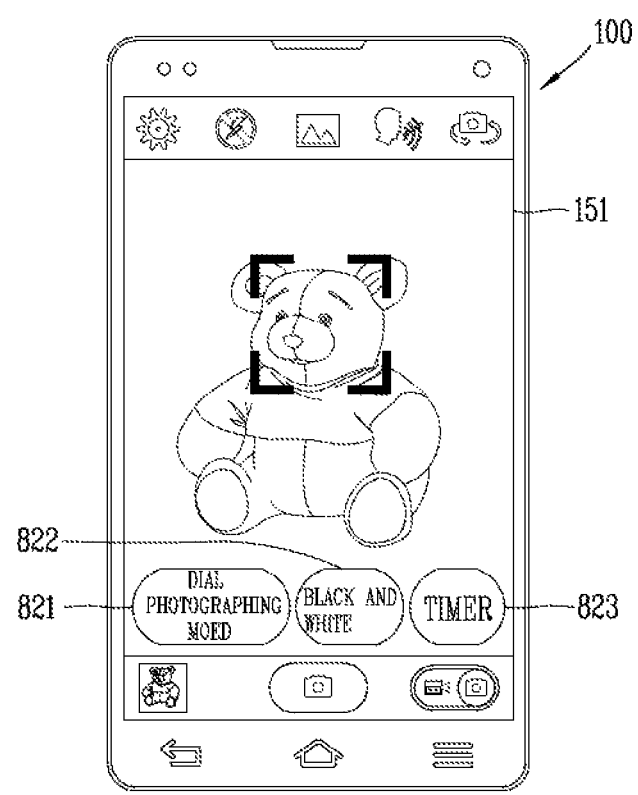

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to U.S. Provisional Application No. 61/858,620, filed on Jul. 26, 2013 and Korean Application No. 10-2013-0139281, filed on Nov. 15, 2013, the contents of which is incorporated by reference herein in its entirety.

BACKGROUND OF THE INVENTION

1. Field of the Invention

The present invention relates to a mobile terminal equipped with an image capture function and a method of controlling the mobile terminal.

2. Background of the Invention

A mobile terminal is configured to perform various functions such as a data and voice communication function, a function of capturing an image or a moving image of a photographic subject with a camera, a function of storing a voice, a function of playing back a music file using a speaker system, a function of displaying an image or video, and so on. Furthermore, the mobile terminal includes an additional function, such as playing a game and serves as a multimedia player. The recently-developed mobile terminal can also receive multicast signals so that a user can view video or a television program with the mobile terminal.

In addition, efforts have been made to enhance the existing functions of the mobile terminal and additionally equip the mobile terminal with innovative functions. From a software or hardware perspective, efforts have also been made for structural changes to and modifications to constituent elements that make up the mobile terminal.

In addition, in recent years, the improved resolution and functions of the camera mounted on the mobile terminal have increased practical application of the camera mounted on the mobile terminal.

SUMMARY OF THE INVENTION

Therefore, one aspect of the present invention is to provide a mobile terminal including a user interface environment in which the user can obtain a desired image of a photographic subject, and a method of controlling the mobile terminal.

To achieve these and other advantages and in accordance with the purpose of this specification, as embodied and broadly described herein, the present invention provides in one aspect a mobile terminal including a camera; a display unit configured to display an image input through the camera; and a controller configured to display at least one user-defined icon corresponding to linked image-setting information, receive a touch signal indicating a touch is applied to a corresponding user-defined icon, and control the camera to capture the image based on image-setting information linked to the corresponding user-defined icon in response to the received touch signal. The present invention also provides a corresponding method of controlling the mobile terminal.

Further scope of applicability of the present application will become more apparent from the detailed description given hereinafter. However, the detailed description and specific examples, while indicating preferred embodiments of the invention, are given by illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 3 is a flowchart illustrating a method of controlling the mobile terminal according to one embodiment of the present invention;

FIGS. 7A, 7B, 7C, and 7D(a) and 7D(b) are diagrams illustrating a method in which a preview image according to image-setting information linked to the image user-defined icon is provided in the mobile terminal according to an embodiment of the present invention;

DETAILED DESCRIPTION OF THE INVENTION

Description will now be given in detail of the embodiments, with reference to the accompanying drawings. For the sake of brief description with reference to the drawings, the same or equivalent components will be provided with the same reference numbers, and description thereof will not be repeated. The suffixes attached to components of the wireless speaker, such as 'module' and 'unit or portion' were used for facilitation of the detailed description of the present invention. Therefore, the suffixes do not have different meanings from each other.

The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The mobile terminal according to an embodiment of the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, the present invention is also applicable to a fixed terminal such as a digital TV and a desktop computer, except for specific configurations for mobility.

Figure 1:
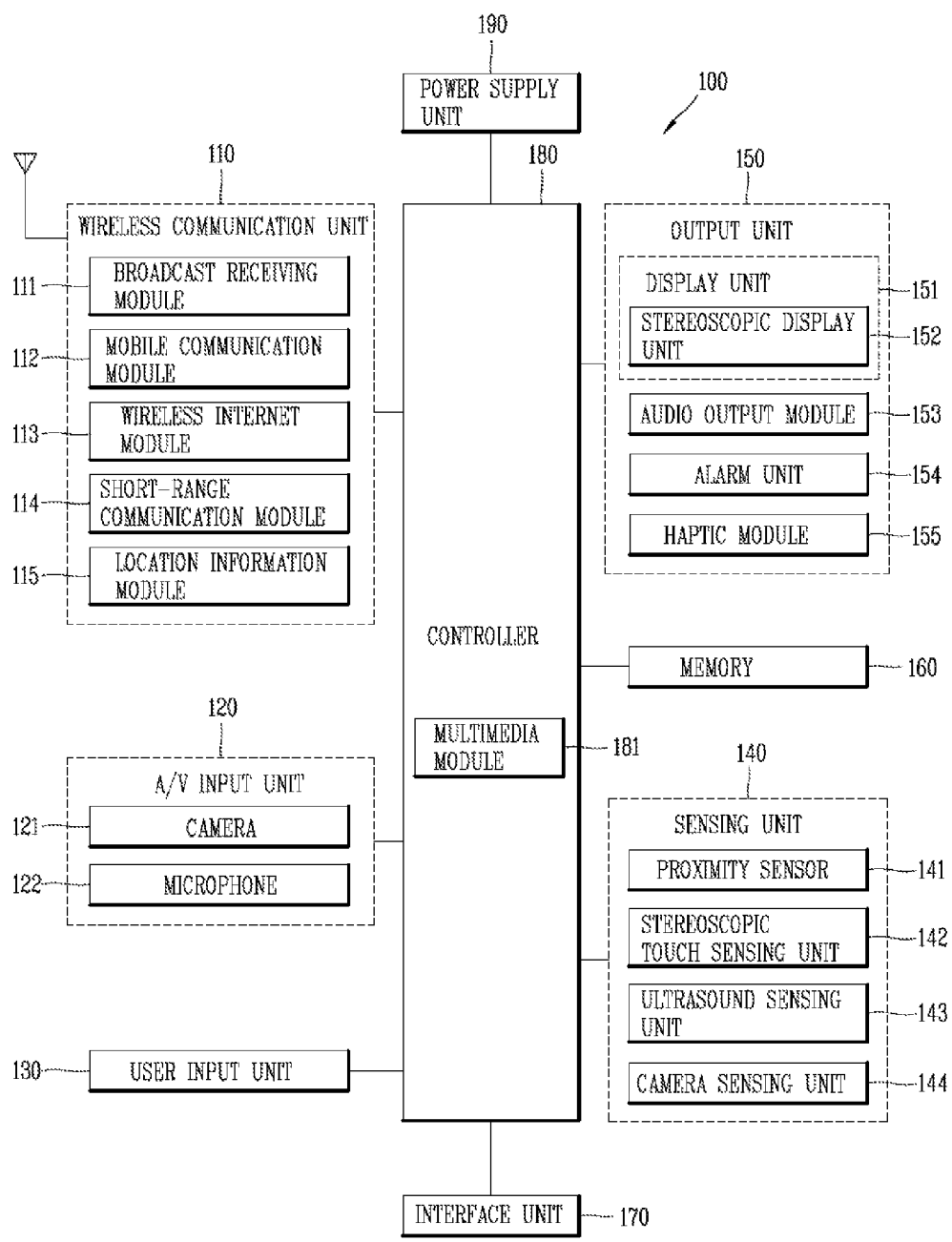
FIG. 1 is a block diagram illustrating a mobile terminal according to one embodiment of the present invention.

FIG. 1 is a block diagram of a mobile terminal according to an embodiment of the present invention. As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. The mobile terminal 100 may be implemented by greater or fewer components.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and. In this instance, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 can receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 for the phone call mode. The microphone 122 may implement various types of noise canceling (or suppression) algorithms to cancel (or suppress) noise or interference generated in the course of receiving and transmitting audio signals.

The user input unit 130 can generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display 151 with a stereoscopic display unit 152, an audio output unit 153, an alarm unit 154, a haptic module 155, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Further, if the display 151 and a touch sensitive sensor (referred to as a touch sensor) have a layered structure therebetween, the structure can be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller. The touch controller processes the received signals, and then transmits corresponding data to the controller 180. Accordingly, the controller 180 can sense which region of the display 151 has been touched.

In addition, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this instance, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The stereoscopic display unit 152 can display stereoscopic images such as 3D images, etc. The audio output unit 153 may output audio data received from the radio communication unit 110 or stored in the memory 160 in a call signal reception mode, a call mode, a record mode, a voice recognition mode, a broadcast reception mode, and the like. Also, the audio output unit 153 may provide audible outputs related to a particular function (e.g., a call signal reception sound, a message reception sound, etc.) performed in the mobile terminal 100. The audio output unit 153 may include a receiver, a speaker, a buzzer, etc.

The alarm unit 154 outputs a signal for informing about an occurrence of an event of the mobile terminal 100. Events generated in the mobile terminal may include call signal reception, message reception, key signal inputs, and the like. In addition to video or audio signals, the alarm unit 154 may output signals in a different manner, for example, to inform about an occurrence of an event. For example, the alarm unit 154 may output a signal in the form of vibration. The video signal or audio signal may be output through the display 151 or the audio output unit 153. Therefore, the display 151 and the audio output unit 153 may be categorized as part of the alarm unit 154.

The haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 generally controls the overall operations of the mobile terminal. For example, the controller 180 performs controlling and processing associated with voice calls, data communications, video calls, and the like. The controller 180 can include a multimedia module 181 for reproducing multimedia data. The multimedia module 181 may be configured within the controller 180 or may be configured to be separated from the controller 180.

The controller 180 can perform a pattern recognition processing to recognize a handwriting input or a picture drawing input performed on the touch screen as characters or images, respectively.

Once a preset condition of the mobile terminal is satisfied, the controller 180 can execute a locked state for limiting a user's input of control commands with respect to applications. In addition, the controller 180 can control a locked screen displayed in the locked state, based on a touch input sensed by the display (hereinafter, will be referred to as 'touch screen' 151) in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof. For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
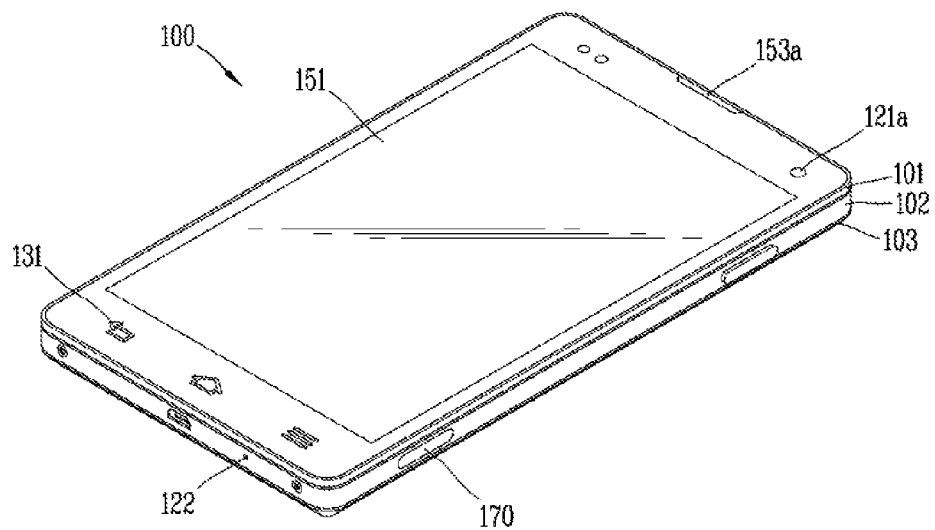
FIGS. 2A and 2B are front and rear perspective diagrams illustrating an example of the mobile terminal according to one embodiment of the present invention.
Figure 2B:
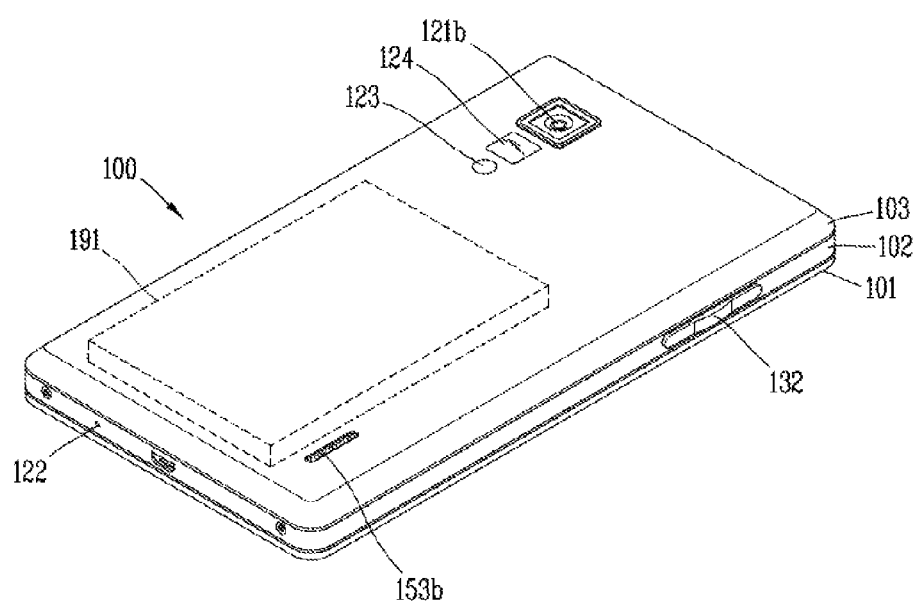

Hereinafter, a structure of the mobile terminal of FIG. 1 according to an embodiment of the present invention will be explained. In particular, FIG. 2A is a front perspective view of the mobile terminal according to an embodiment of the present invention, and FIG. 2B is a rear perspective view of the mobile terminal of FIG. 2A according to an embodiment of the present invention The mobile terminal 100 according to the present invention is a bar type mobile terminal. However, the present invention is not limited to this, but is applied to a slide type in which two or more bodies are coupled to each other so as to perform a relative motion, a folder type, or a swing type, a swivel type and the like.

A terminal body (hereinafter, will be referred to as a body) is provided with a front surface, side surfaces and a rear surface. The body is provided with two ends in a lengthwise direction. A case (casing, housing, cover, etc.) forming an outer appearance of the body 100 may include a front case 101 and a rear case 102. A space formed by the front case 101 and the rear case 102 may accommodate various components therein.

At least one intermediate case may further be disposed between the front case 101 and the rear case 102. Such cases may be formed by injection-molded synthetic resin, or may be formed using a metallic material such as stainless steel (STS) or titanium (Ti). A battery case 103 may also be provided.

At the front case 101, may be disposed a display 151, an audio output unit 153a, a camera 121a, user input units 130, 131 and 132, a microphone 122, an interface unit 170, etc. Further, the display 151 occupies most parts of a main surface of the front case 101. The audio output unit 153a and the camera 121a are arranged at a region adjacent to one end of the display 151, and the first user input unit 131 and the microphone 122 are arranged at a region adjacent to another end of the display 151.

The user input unit 132, the interface unit 170, etc. may be arranged on side surfaces of the front case 101 and the rear case 102. The microphone 122 is arranged at another end of the body 100. The user input unit 130 is manipulated to receive a command for controlling the operation of the mobile terminal 100, and may include a plurality of manipulation units 131 and 132. The manipulation units 131 and 132 may be referred to as manipulating portions, and may include any type of ones that can be manipulated in a user's tactile manner.

Commands input through the first or second user input units 131 and 132 may be variously set. For instance, the first manipulation 131 is configured to input commands such as START, END, SCROLL or the like, and the second manipulation unit 132 is configured to input commands for controlling a level of sound output from the audio output unit 153a, or commands for converting the current mode of the display 151 to a touch recognition mode.

Referring to FIG. 2B, a rear camera 121b may be additionally provided on the rear case 102. The rear camera 121b faces a direction which is opposite to a direction faced by the camera 121, and may have different pixels from the camera 121.

For example, the camera 121a may operate with relatively lower pixels (lower resolution). Thus, the camera 121a may be useful when a user can capture their face and send it to another party during a video call or the like. In this instance, the camera 121a can reduce the size of transmission data. Further, the camera 121b may operate with a relatively higher pixels (higher resolution) such that it can be useful for a user to obtain higher quality pictures for later use. The cameras 121a and 121b may be installed at the body 100 so as to rotate or pop-up.

A flash 123 and a mirror 124 may be additionally disposed adjacent to the camera 121b. The flash 123 operates in conjunction with the camera 121b when taking a picture using the camera 121b. The mirror 124 can cooperate with the camera 121b to allow a user to photograph in a self-portrait mode.

An audio output unit 153b may be additionally arranged on a rear surface of the body. The audio output unit 153b may cooperate with the audio output unit 152a so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body and include a battery 191.

A touch pad for sensing touch may be additionally mounted to the rear case 102. Like the display 151, the touch pad may be formed to be light-transmissive. In this instance, a rear display for outputting visual information may be additionally mounted to the touch pad. Information output from the display 151 (front display) and the rear display may be controlled by the touch pad. Alternatively, a display may be additionally mounted to the touch pad, and a touch screen may be arranged at the rear case 102.

The touch pad operates in association with the display 151 of the front case 101. The touch pad may be disposed on the rear surface of the display 151 in parallel. The touch pad may have a size equal to or smaller than that of the display 151.

In addition, in the mobile terminal according to an embodiment of the present invention, an image capture function in which an image received through a camera is stored in a memory. Further, the operation of the mobile terminal in which the image received from the camera is stored in the memory is defined as expressions such as "to capture an image of a photographic subject," "to capture an image," "to obtain an image," and so on. In addition, such operation of the mobile terminal is not limited to the expressions described above, but can be described by freely using whatever expression means that the image received through the camera is stored in the memory unit 160.

The mobile terminal according to an embodiment of the present invention performs the image capture function, based on user's selection, and the user's selection is expressed as a "user's control command," and a "control command." Further, the user's selection is made in various ways. For example, the user can select the image capture function by touching on or pressing on a hardware key provided in the mobile terminal 100 or by touching on a software key or a visual key that is output to the display unit 151.

That is, if the hardware key linked to the image capture function is touched on or is pressed on or the software key or the visual key output to the display unit 151 is touched on, the controller 180 determines that the user's control command for performing the image capture function is received. The controller 180 controls the camera 121 to capture an image input through the camera 121 based on the control command.

In addition, the image capture function can be performed when a user's voice corresponding to a predetermined command is input into a microphone, a specific gesture is applied to the mobile terminal, or a predetermined motion is detected in the mobile terminal.

Figure 4A:
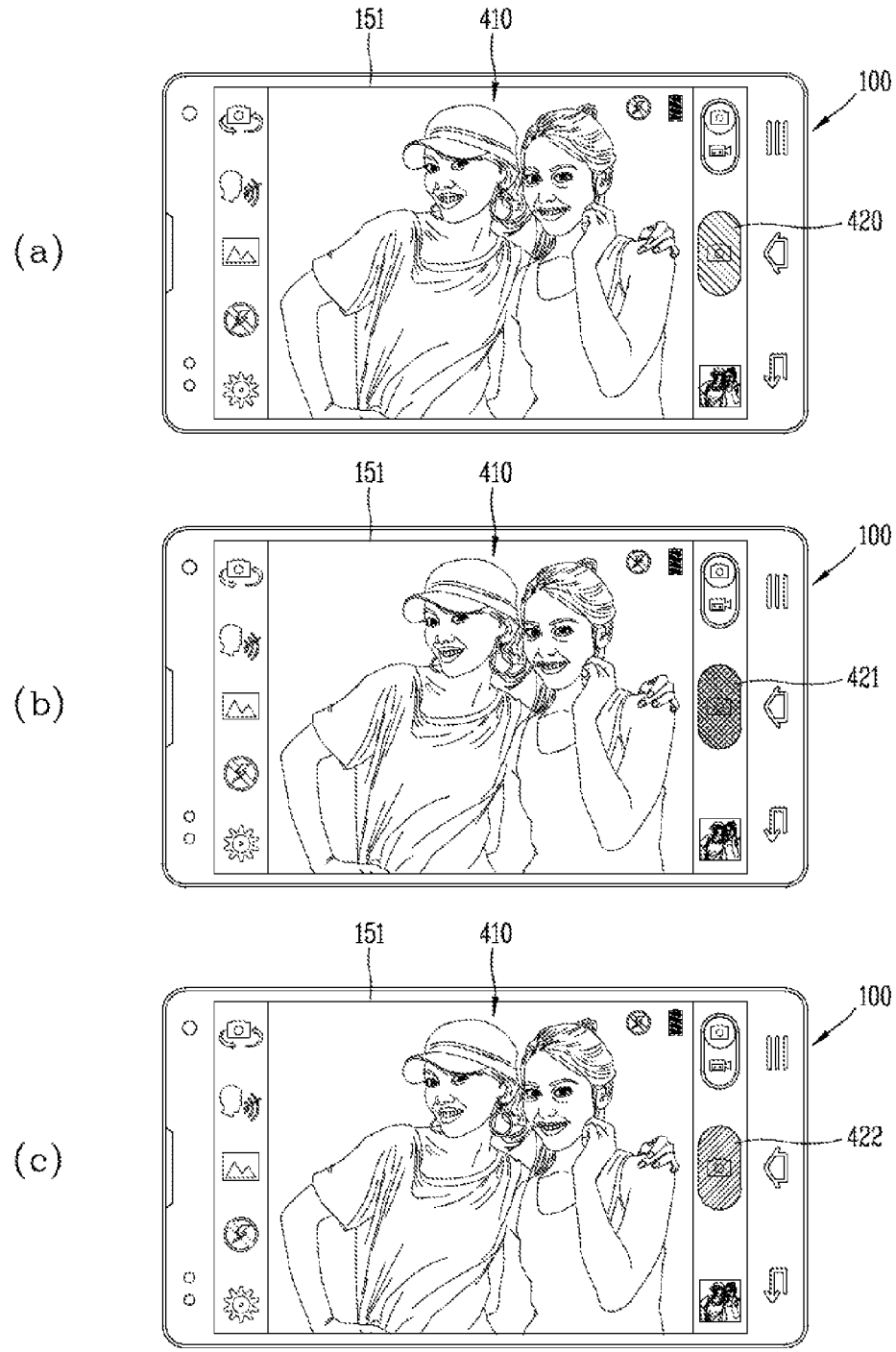
FIGS. 4A(a) to 4A(c) and FIGS. 4B(a) to 4B(c) are diagrams illustrating the control method in FIG. 3.
Figure 4B:
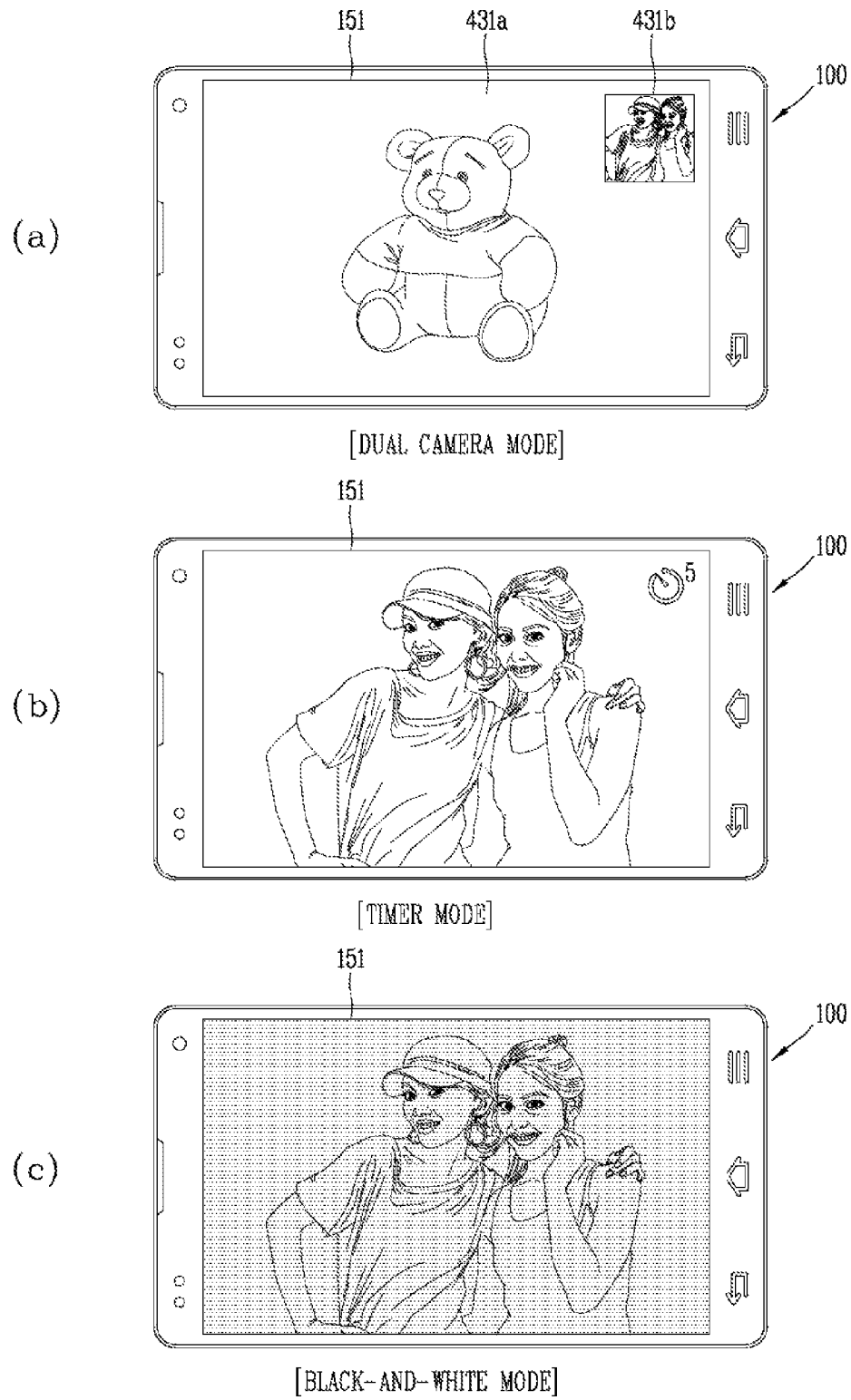

Further, one embodiment of the present invention provides a user interface environment in which an image suitable for a user's preference can be immediately obtained. In particular, FIG. 3 is a flowchart illustrating a method of controlling the mobile terminal according to one embodiment. FIGS. 4A and 4B are diagrams illustrating the control method in FIG. 3.

As shown in FIG. 3, the controller 180 performs the image capture function (S310). Performing the image capture function means performing of an application for capturing an image. If the image capture function is performed, the controller 180 activates the camera 121 and prepares the camera 121 for capturing an image of the photographic subject.

As discussed above, the image capture function is performed based on selection (or touch-on of an icon linked to the image capture function or an icon for an application). If the image capture function is performed through the icon, the display unit 151 is in an ON state. In addition to the method of selecting the icon linked to the image capture function, if at least one key (for example, at least one among the hardware key and the software key) provided in the mobile terminal is selected, the image capture function is performed. In this instance, even though the display unit 151 is in an OFF state, the controller 180 can perform the image capture function, corresponding to the selection of the key provided in the mobile terminal. The controller 180 can also perform the image capture function in a locked screen state.

When the image capture function is performed, the controller 180 outputs at least one user-defined icon to which image-setting information is linked (S320). That is, the user-defined icon is linked with the image-setting information. When the user-defined icon is selected or touched on, the controller 180 obtains (or stores) an image corresponding to the linked image-setting information.

Further, when the image capture function is performed in S310, as illustrated in FIGS. 4A(a) and 4A(b), the image (a preview image) input through the camera 121 is output to one region 410 of the display unit 151, along with at least one user-defined icon 420. Further, the image-setting information includes setting information relating to at least one among driving of the camera and software processing of the image being captured.

For example, the image-setting information relating to driving of the camera includes on ISO, a shutter speed, an aperture, white balance, focus, resolution, an exposure value, flash, consecutive photographing, the number of consecutive photographing shots, timer setting, timer-setting time, a dual photographing mode, and so on. In addition, the image-setting information relating to software processing includes information relating to a function in which the obtained image is controllably processed in the mobile terminal, such as color compensation, brightness adjustment, sharpness, and exposure-value adjustment. Further, many items of image-setting information relating to the driving of the camera and many items of the image-setting information relating to the software processing are present in addition to the items of image-setting information enumerated above.

Thus, the user-defined icon is linked to the setting information (or a setting value) relating to at least one item of information among the various items of information enumerated above. Further, according to an embodiment of the present invention, an image capture is possible through a basic icon through which a basic photographing function is performed, in addition to the user-defined icon.

In more detail, the basic icon is an icon to which basic image-setting information is linked and which is basically provided in an application associated with the image capture. In addition, the controller 180 can set one among the icons to which the items of image-setting information described above are linked, to be the basic icon.

According to an embodiment of the present invention, when the image capture function is performed, after the basic icon is first output, if a user's request is made, the basic icon is output along with the user-defined icon, or the user-defined icon is output instead of the basic icon. As another example, if the image capture function is performed, the basic icon and the user-defined icon are output together. As another example, if the image capture function is performed, the user-defined icon is first output, and if the user's request is made, the basic icon is output.

Further, when the user-defined icon, as described above, is output on the display unit 151 through one method among the methods in the various examples, and when a touch is applied to the user-defined icon, the controller 180 recognizes this as a request for capturing the image and processes the request for capturing the image (S330). In addition to the method in which the icon output to the display unit 151 is touched on, the request for capturing the image can be made through various methods. Because the various methods are similar to those of performing the image capture function, detailed descriptions of these methods are omitted.

Then, when the request for capturing the image is processed in this manner, the controller 180 obtains an image corresponding to the image-setting information linked to the user-defined icon that is touched on (S340).

As discussed above, when the user-defined icon is touched on, the controller 180 recognizes this as the request for capturing the image and processes the request for capturing the image. The controller 180 drives the camera before the image capture or controls the captured image so the image corresponding to the image-setting information linked to the user-defined icon is obtained.

When the user-defined icon is selected, the controller 180 controls the mobile terminal so the image corresponding to the selected user-defined icon is obtained. Accordingly, the user can obtain the image suitable for his/her preference by only selecting an icon for photographing, without having to make a change to the settings through the selection of a setting menu, the selection of a setting icon, or the like before capturing the image of the photographic subject.

Examples of the images that are obtained through the user-defined icon are described in detail below. Icons 420, 421, and 422 illustrated in FIG. 4A(a) to 4A(c) are user-defined icons to which the items of image-setting information are linked. As one example, the user-defined icon 420 illustrated in FIG. 4A(a) corresponds to user-set information for performing the image capture in a dual photographing mode. The controller 180 then performs control so images are captured using the multiple cameras provided in the mobile terminal 100.

Accordingly, as illustrated in FIG. 4B(a), multiple images 431a and 431b that are captured through the multiple cameras, respectively, are output together to the display unit 151. Further, the multiple images 431a and 431b may be output separately. Thus, when the user-defined icon 420 to which the setting information relating to the dual photographing mode is linked is selected, the controller 180 drives the multiple cameras at the same time so the multiple images are captured. Accordingly, the user can save the inconvenience of switching a photographing mode to the dual photographing mode and then selecting a photographing icon.

As another example, the user-defined icon 421 illustrated in FIG. 4A(b) is linked with user-set information relating to a timer mode. Then, the controller 180, as illustrated in FIG. 4B(b), controls the camera so the image is captured after a predetermined time elapses. Further, information on the predetermined time is included and present in the setting information linked to the user-defined icon 421.

Thus, when the user-defined icon 421 to which the setting information relating to the timer mode is selected, the controller 180 captures the image through the camera after the predetermined time elapses. The controller 180 can also perform the control so the multiple images are captured after the predetermined time elapses. Accordingly, the user can save the inconvenience of switching the photographing mode to the timer mode and then selecting the photographing icon.

As another example, the user-defined icon 422 illustrated in FIG. 4A(c) is linked with user-set information for performing black-and-white processing on the captured image. When this icon 422 is selected, the controller 180 performs the control so the camera provided in the mobile terminal captures the image, and then as illustrated in FIG. 4B(c), performs black-and-white processing on the captured image in software.

Thus, the black-and-white-processed image is output on the display unit 151. Further, it is apparent that the black-and-white processing associated with color, such as the black-and-white processing, is not necessarily possible only in software and if adjustment of color impression is possible in the camera itself, can be performed through the camera as well. As described above, in the mobile terminal according to an embodiment of the present invention and the method of controlling the mobile terminal, the image that has a setting value that the user wants is immediately captured through the user-defined icon in which the image-setting information is defined.

A method of providing and using the user-defined icon is described in detail below referring to the accompanying drawings and using the examples described above. There are various modification examples of the method of outputting the user-defined icon, such as determining whether or not the user-defined icon linked with the image-setting information is output immediately after performing the image capture function, determining what manner is used if the user-defined icon is immediately output, and determining what manner is used to output the user-defined icon if the user-defined icon is not immediately output.

Several methods among the various methods of outputting the user-defined icon are described below using examples. In particular, FIGS. 5A(a) to 5A(c), FIGS. 5B(a) and 5B(b), and FIG. 5C are diagrams illustrating providing the user-defined icon in the mobile terminal 100 according to an embodiment of the present invention.

As one example, when the image capture function is performed, a basic icon 501 is preferentially output on the display unit 151 as illustrated in FIG. 5A(a). The basic icon 501 is an icon basically provided in the application that has the image capture function. When the basic icon 501 is output, according to a touch type applied to the basic icon 501, the controller 180 determines whether or not the image is immediately captured or whether or not at least one user-defined icon is output.

Further, if the basic icon 501 is touched on, the controller 180 obtains an image corresponding to a basic image-setting information linked to the basic icon 501. More specifically, when a first-type touch, for example, a short touch, is applied to the basic icon 501, the controller 180, as illustrated in FIG. 5A(b), obtains an image with a current setting. When a second-type touch different from the first-type touch, for example, a long touch, is applied to the basic icon 501, the controller 180, as illustrated in FIG. 5A(c), outputs at least one or more user-defined icons 521, 522, and 523 on the display unit 151

Thus, at least or more user-defined icons 521, 522, and 523 are output corresponding to the second-type touch, for example, the long touch applied to the basic icon 501. That is, according to an embodiment of the present invention, multiple settings are assigned to one icon, and thus control is performed that differs according to the touch type that is applied to the icon. Further, at least one or more user-defined icons 521, 522, and 523 are output based on a second touch applied to the basic icon, and then based on a touch applied to one user-defined icon among the user-defined icons 521, 522, and 523, an image corresponding to the image-setting information linked to the touched user-defined icon is obtained.

Then, at least one or more user-defined icons 521, 522, and 523 disappear from the display unit 151. That is, after the image is captured through the user-defined icon 521, 522, and 523, the controller 180 stops the output of the user-defined icons 521, 522, and 523 and displays only the basic icon. In addition, when the user-defined icons 521, 522, and 523 are displayed, the basic icon 501 may not be output on the display unit 151. Further, even though the capture using the user-defined icons 521, 522, and 523 is finished, the user-defined icons 521, 522, and 523 can continue to be displayed until the user's request is made.

Figure 5B:
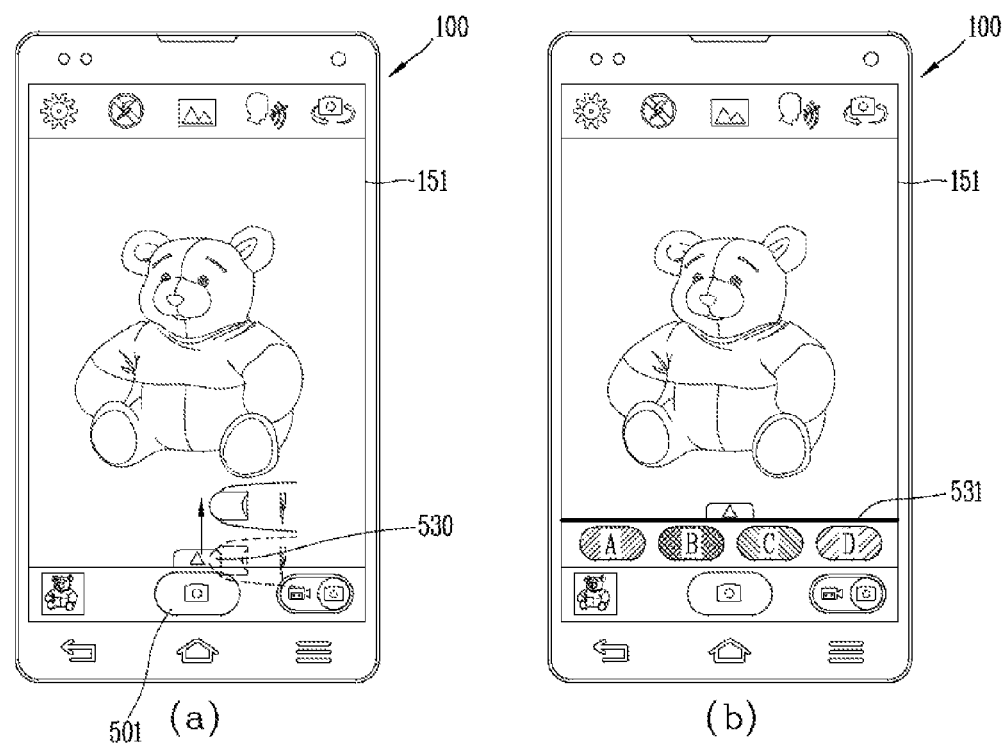
FIG. 5A(a) to 5A(c), FIGS. 5B(a) and 5B(b), and FIG. 5C are diagrams illustrating a method in which a user-defined icon is provided in the mobile terminal according to an embodiment of the present invention.
Figure 5C:
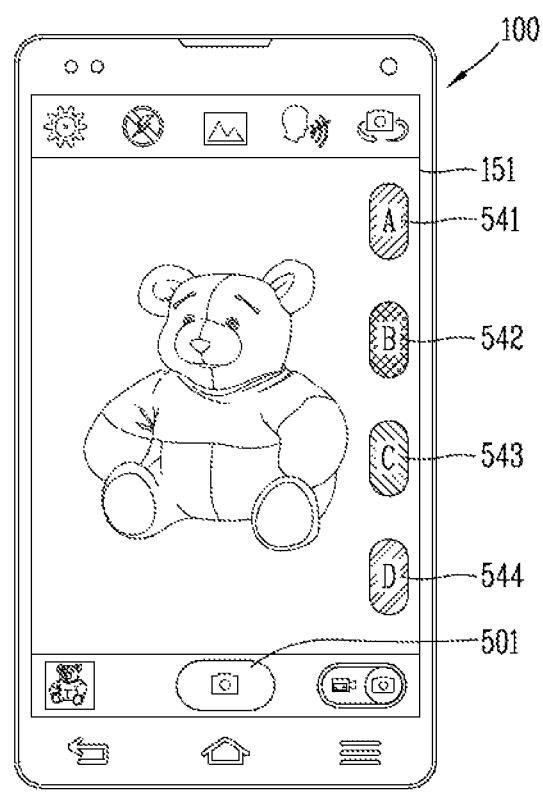

As another example, when the image capture function is performed, as illustrated in FIG. 5B(a), the basic icon 501 is output on the display unit 151, along with a graphic object 530 for selecting the output of the user-defined icon. Accordingly, if the user's selection is made on the graphic object 530 as illustrated in FIG. 5B(a), the controller 180 outputs at least one user-defined icon 531 as illustrated in FIG. 5B(b). Further, at least the one user-defined icon 531 can stop being displayed on the display unit 151 based on another selection of the graphic object 530. That is, the user can determine whether the user-defined icon is output on the display unit 151, using the touch applied to the graphic object 530.

Further, when the graphic object 530 is dragged in a first direction, the controller 180 displays the user-defined icon, and when the graphic object 530 is dragged in a second direction, stops displaying of the user-defined icon. Also, in this example, after the image is captured through the user-defined icon, the controller 180 stops displaying the user-defined icon and only displays the basic icon.

As another example, as illustrated in FIG. 5C, when the image capture function is performed, the controller 180 displays the basic icon 501 on the display unit 151, along with at least one or more user-defined icons 541, 542, 543, and 544. That is, regardless of a predetermined-type touch applied to the basic icon 501 and of the user's request, the controller 180 can display the basic icon along with the user-defined icon.

Thus, a user environment is provided in which the user can have faster access to the user-defined icon in performing the image capture function. Further, when the image capture function is performed, the controller 180 can determine whether the basic icon is displayed along with the user-defined icon based on a user's setting. In addition, the user-defined icon can be provided in various shapes.

Figure 6A:
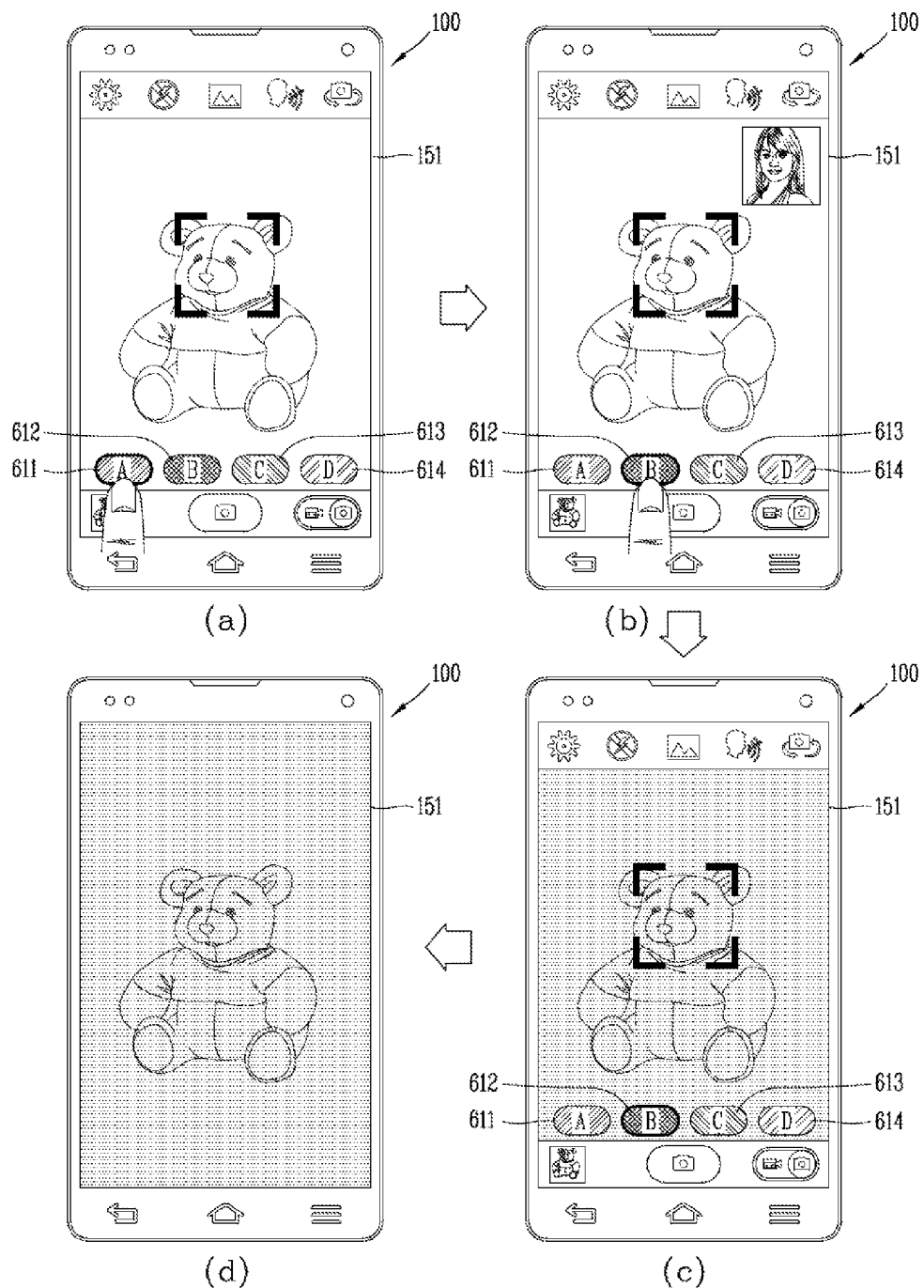
FIGS. 6A(a) to 6A(d), 6B(a) to 6B(d), and 6C(a) and 6C(b) are diagrams illustrating a method in which the user-defined icon is used in the mobile terminal according to an embodiment of the present invention.
Figure 6B:
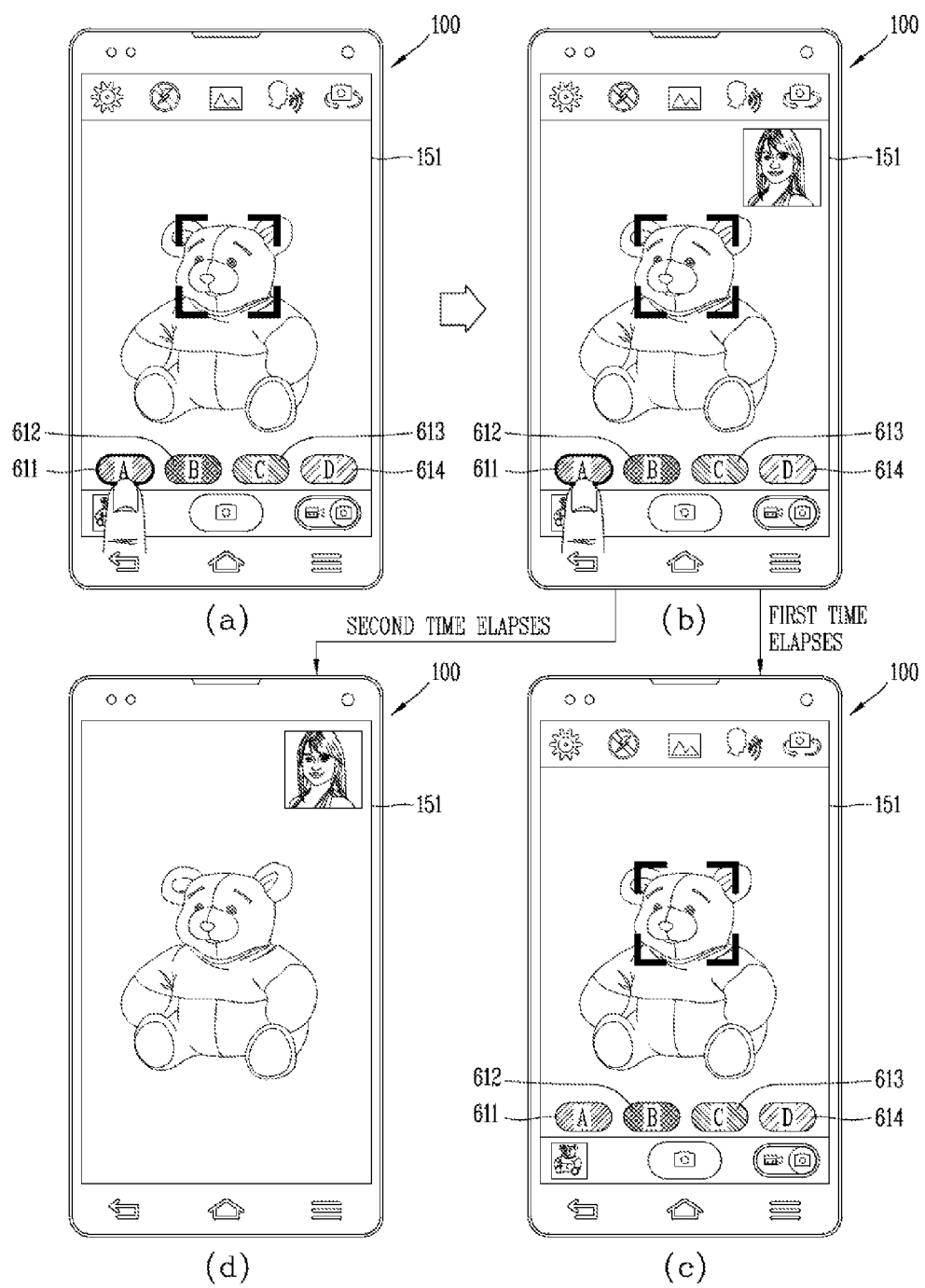
Figure 6C:
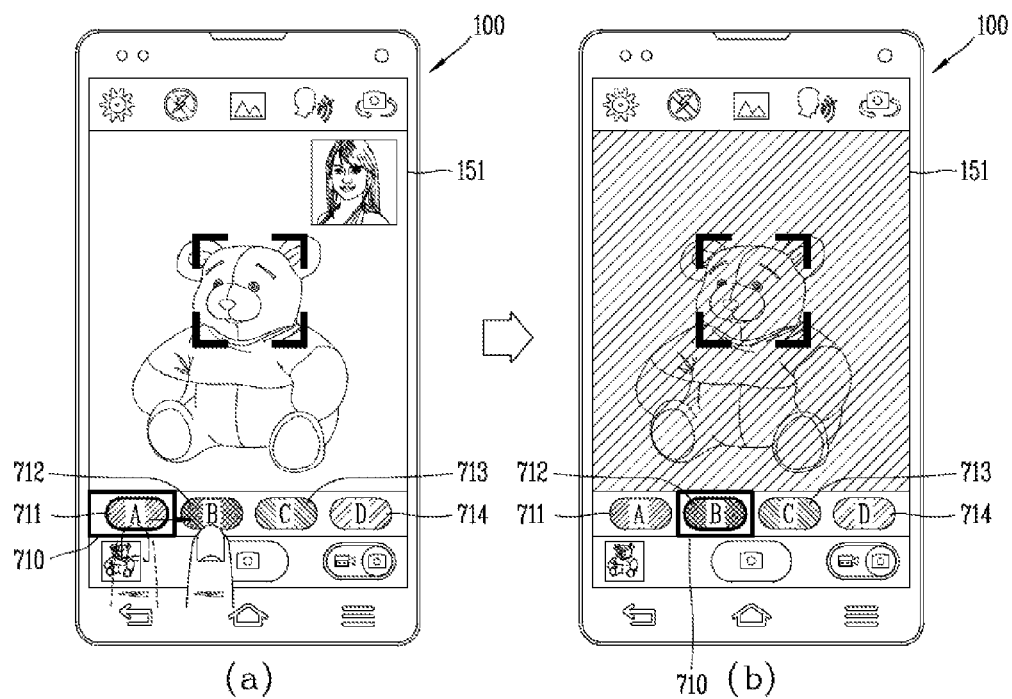

Next, a method is described below about what type of image-setting information is linked to the user-defined icon. In particular, FIGS. 6A to 6C are diagrams illustrating a method in which an image user-defined icon is used in the mobile terminal 100 according to an embodiment of the present invention. In the following description, the user-defined icon is assumed to be displayed on the display unit 151. Thus, a description of a process of outputting the user-defined icon on the display unit 151 is omitted.

If multiple user-defined icons are displayed on the display unit 151, the user may have difficulty grasping what user-set information is linked to each of the multiple user-defined icons. Therefore, according to an embodiment of the present invention, a preview image (or a prior view) in accordance with the user-set information linked to the user-defined icon is displayed corresponding to the predetermined type touch applied to the user-defined icon.

The preview image in accordance with the user-set information linked to the user-defined icon is provided in various methods. The preview image means an image input through the camera is output in real time before being captured by the camera. As one example, the controller 180 provides the preview image corresponding to a first-type touch applied to the user-defined icon and obtains the image corresponding to the user-set information linked to the corresponding user-defined icon corresponding to a second-type touch.

For example, if the first-type touch (for example, the short touch) as illustrated in FIG. 6A(a) is applied to one user-defined icon 611, among multiple user-defined icons 611, 612, 613, and 614, the controller 180 displays a preview image in accordance with the user-set information linked to the one user-defined icon 611 as illustrated in FIG. 6A(b).

When the preview image in accordance with the user-set information linked to the one user-defined icon 611 is displayed and when the first-type touch is additionally applied to the user-defined icon 612 different from the one user-defined icon 611, the controller 180 displays the preview image including the user-set information linked to the user-defined icon 612 as illustrated in FIG. 6A(c).

Further, when the preview image is displayed as illustrated in FIG. 6A(c), and if the user-defined icon 612 corresponding to the currently-output preview image is selected again, the controller 180 captures an image corresponding to the user-set information linked to the user-defined icon 612 as illustrated in FIG. 6A(d). Further, when the preview image is displayed, any touch type can be to select the corresponding user-defined icon again to capture an image corresponding to the corresponding preview image. That is, according to an embodiment of the present invention, the image of the corresponding user-defined icon is obtained without distinguishing between the short touch and the long touch applied to the corresponding user-defined icon.

In addition, according to an embodiment of the present invention, when the preview image corresponding to the user-defined icon is displayed and the basic icon is again selected, the controller 180 can stop displaying the preview image corresponding to the user-defined icon and display the preview image corresponding to the basic icon.

Further, according to an embodiment of the present invention, when the second-type touch different from the first-type touch is applied to the user-defined icon 611, an image in accordance with the user-set information linked to the user-defined icon 611 is immediately obtained. That is, the controller 180 displays the preview image, corresponding to the first-type touch applied to the user-defined icon, and obtains the image corresponding to the second-type touch.

Thus, when a first touch corresponding to a predetermined type is applied to one user-defined icon among the multiple user-defined icons, the controller 180 controls an image input through the camera, so the preview view corresponding to the image-setting information linked to the one user-defined icon is output, and when the second touch that is different in type from the first touch is applied to the one user-defined icon, the controller 180 stores in the memory 160 an image corresponding to the image-setting information linked to the one user-defined icon.

As another example, based on maintaining of the touch to the user-defined icon, the controller 180 outputs the preview image associated with the corresponding user-defined icon. For example, when the touch as illustrated in FIG. 6B(a) is applied to the one user-defined icon 611 and then the application of the touch is maintained, the controller 180 outputs the preview image associated with the corresponding user-defined icon 611, as illustrated in FIG. 6B(b).

In addition, the controller 180 performs different control according to how long the application of the touch to the user-defined icon 611 is maintained. For example, when the application of the touch to the user-defined icon 611 is maintained for a first time period and then the touch is released, the controller 180 stops outputting the preview image corresponding to the user-defined icon 611 and outputs the preview image corresponding to the basic icon as illustrated in FIG. 6B(c).

When the application of the touch to the user-defined icon 611 is maintained for a second time period and then the touch is released, the controller 180 captures an image corresponding to the user-defined icon 611 as illustrated in FIG. 6B(d).

As another example, in the mobile terminal according to an embodiment of the present invention, a graphic object that moves on the display unit 151 corresponding to a user's touch and thus the preview image is provided. For example, as illustrated in FIG. 6C(a), a graphic object 710 has a size enough to surround one user-defined icon among the multiple user-defined icons. The controller 180 determines the preview image output on the display unit 151 according to where the graphic object 710 is positioned on the display unit 151.

As illustrated, if the graphic object 710 is positioned on a first user-defined icon 711, the preview image in accordance with the user-set information (for example, image capture in the dual photographing mode) and which is linked to the first user-defined icon 711 is output to the display unit 151. Then, when the graphic object 710 is moved to a second user-defined icon 712 based on the user's touch, the controller 180, as illustrated in FIG. 6C(b), outputs the preview image in accordance with the user-set information (for example, black-and-white image capture) and which is linked to the second user-defined icon 712.

The shape of the graphic object 710 can be variously changed. Further, the graphic object 710 can be moved to the basic icon. The user can end the output of the preview image by moving the graphic object 710 to the basic icon. Further, in addition to the methods described above, there are various methods in which the preview image is provided using the user-defined icon.

As described above, the information on the user-defined icon is intuitively provided to the user by providing the preview image in accordance with the user-set information linked to the user-defined icon.

Next, a method is described in detail below in which the preview image in accordance with the image-setting information linked to the user-defined icon is provided. FIGS. 7A to 7D are diagrams illustrating displaying the user-defined icon according to an embodiment of the present invention. According to an embodiment of the present invention, the visual external appearance of the user-defined icon is variously changed. Thus, the user interface environment is provided in which the user can easily grasp the user-set information linked to the user-defined icon.

Figure 7A:
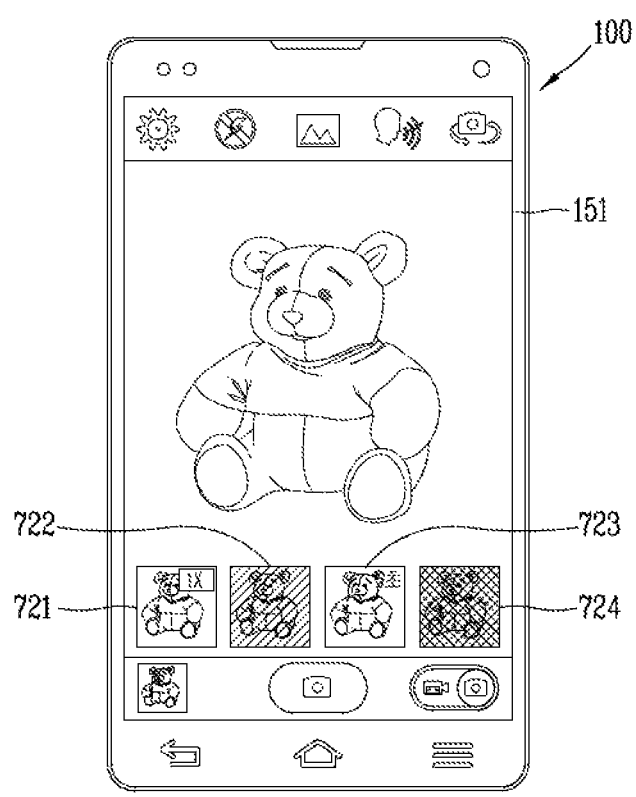

As one example, as illustrated in FIG. 7A, the preview images applied with image-setting information are linked to user-defined icons 721, 722, 723, and 724, respectively. That is, the preview images are used as the user-defined icons 721, 722, 723, and 724. As shown, the user-defined icons 721, 722, 723, and 724 are displayed as preview images, respectively, obtained by causing the images being input through the camera to be in accordance with the items of image-setting information that are linked to the user-defined icons, respectively, so the items of image-setting information linked to the user-defined icons 721, 722, 723, and 724, respectively, are identifiable to the user. In one example, the images of the user-defined icons are changed in real time.

Figure 7B:
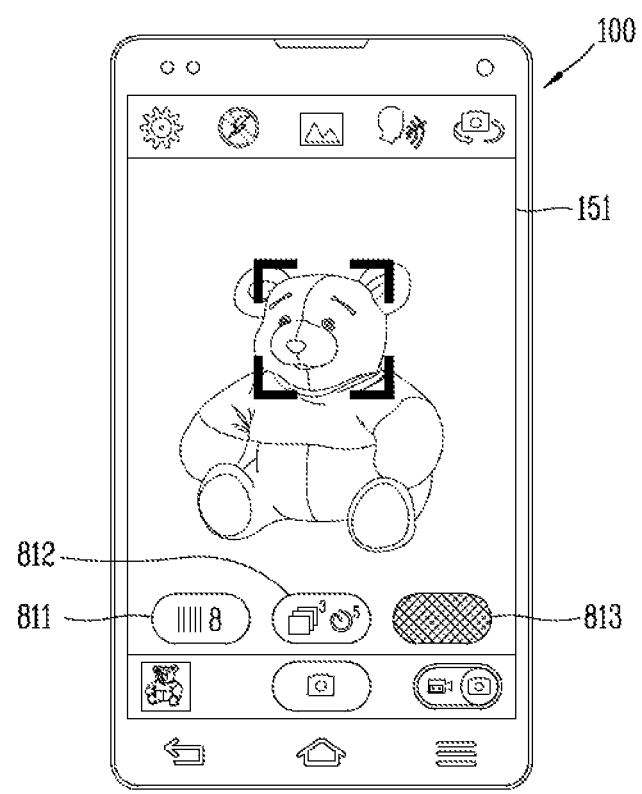

As another example, as illustrated in FIGS. 7B and 7C, the controller 180 displays items of image-setting information linked to user-defined icons 811, 812 and 813, and 821, 822 and 823 respectively, on the icons, using at least one among text and an image that enables the items of image-setting information to be identified. Further, if the multiple items of user-set information are linked to one user-defined icon, the controller 180 displays all items of user-set information on the icons. In addition, the controller 180 displays some items of the user-set information or only one item of user-set information, among the multiple items of user-set information, on the user-defined icons.

In this instance, based on a predetermined priority, the controller 180 determines the user-set information to be represented by the icon, among the multiple items of image-setting information. The priority is determined based on the user' selection or is determined based on at least one reference, among multiple references, such as recently-added setting information, frequently-used setting information, and visually-effective setting information.

Figure 7D:
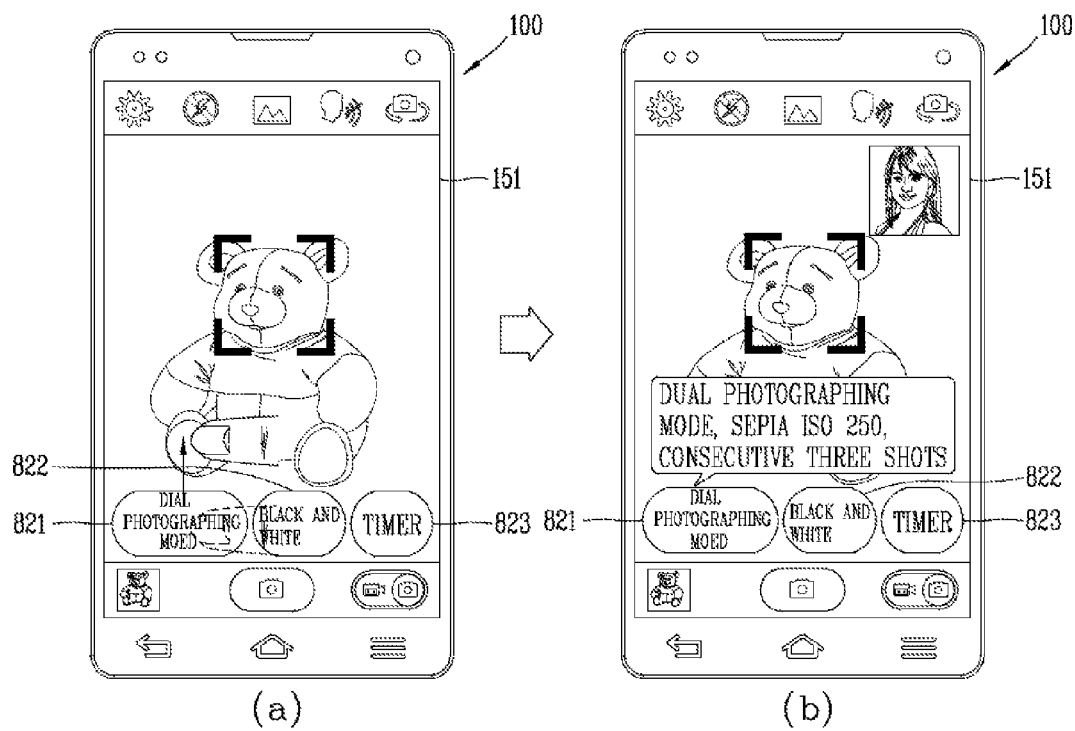

In addition, according to an embodiment of the present invention, more detailed information on the user-set information linked to the user-defined icon is provided to the user. The method of providing the detailed information are modified in various ways. As one example, based on a drag touch that, as described in FIG. 7D(a), is applied to one user-defined icon 821, the controller 180 displays detailed information 820 as illustrated in FIG. 7D(b). The detailed information 820 is output for a predetermined time and then disappears from the display unit 151. In addition, the output of the detailed information 820 is stopped based on the touch-on of a region other than a region to which the detailed information 820 is output.

A method of setting and controlling the user-defined icon is described in detail below referring to the accompanying drawings. FIGS. 8A to 8D are diagrams illustrating a method in which the image-setting information linked to the user-defined icon is set in the mobile terminal according to an embodiment of the present invention.

The user-set information linked to the user-defined icon is determined based on the user's selection. That is, what image-setting information is linked to the user-defined icon is determined based on the user's selection. According to an embodiment of the present invention, a separate edit mode is provided for generating the user-defined icon. The edit mode is entered based on the user's request. As one example, when a specific icon 900 for entering the edit mode or for generating the user-defined icon is selected as illustrated in FIG. 8A(a), multiple items of image-setting information relating to the images that are captured by the camera, and items for setting detailed setting values for the items of image-setting information, as illustrated in FIG. 8A(b), are displayed on one region of the display unit 151.

Figure 8A:
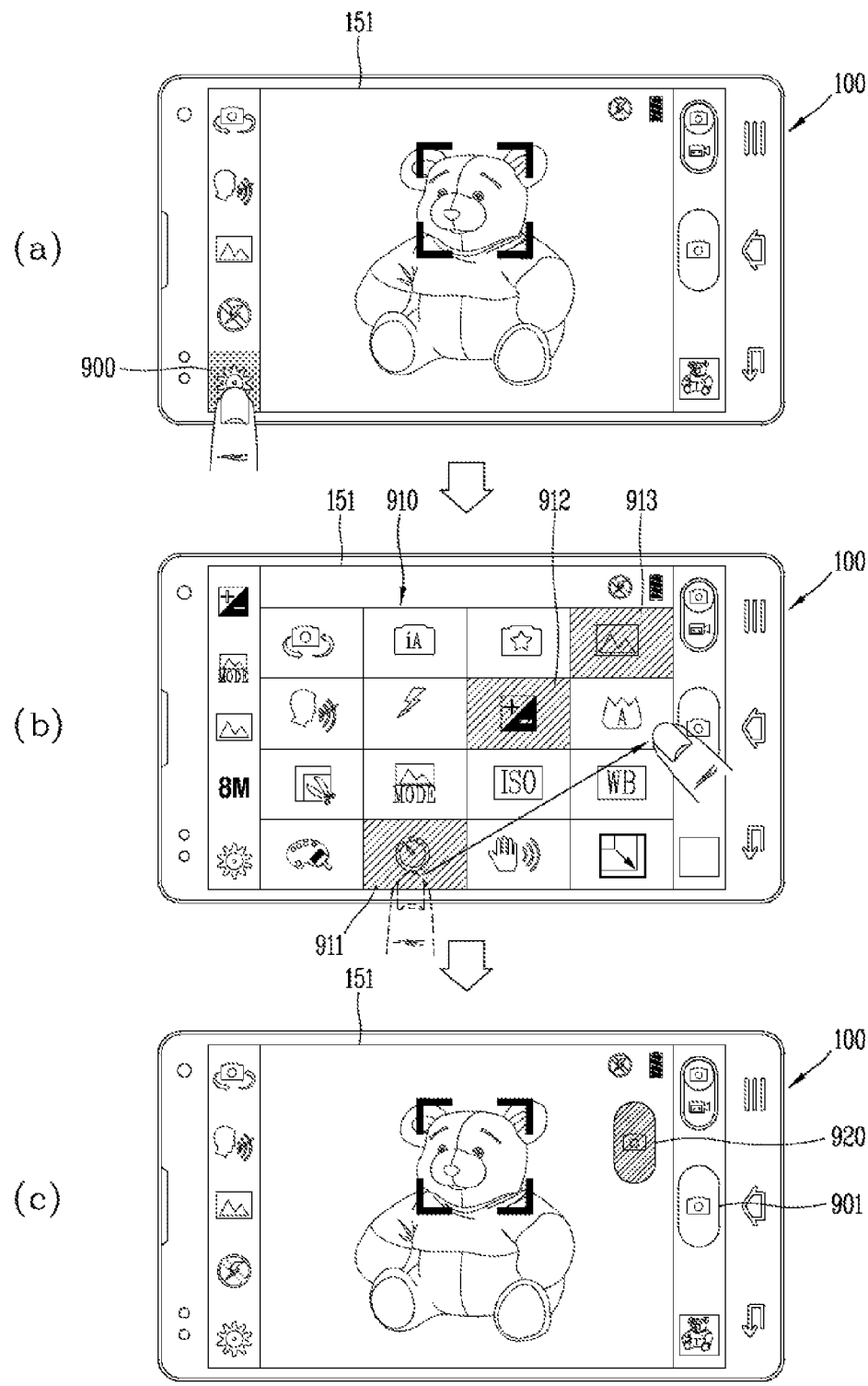
FIGS. 8A(a) to 8A(c), 8B(a) to 8B(c), 8C(a) and 8C(b), and 8D(a) and 8D(b) are diagrams illustrating a method in which the image-setting information linked to the user-defined icon is set in the mobile terminal according to an embodiment of the present invention.

If at least one item is selected by the user in a predetermined way, a user-defined icon 920 is linked with items of image-setting information setting values as illustrated in FIG. 8A(c). Further, in one example, the user-defined icon 920 is not output to the display unit 151 immediately after being generated and thereafter is output on the display unit 151, based on the user's request. In addition, FIG. 8A(b) illustrates image-setting information setting values 911, 912 and 913 being selected among a plurality of different image-setting information setting values 910.

After selecting the items and changing the associated detailed setting values, the user can generate the user-defined icon by moving the items corresponding to the desired image-setting information to a basic icon 901. According to an embodiment of the present invention, if the multiple items are moved to the basic icon until before the user's request for the ending is made, or until before a predetermined time elapses, the multiple items of image-setting information corresponding to the items, respectively, are linked to one user-defined icon.

Figure 8B:
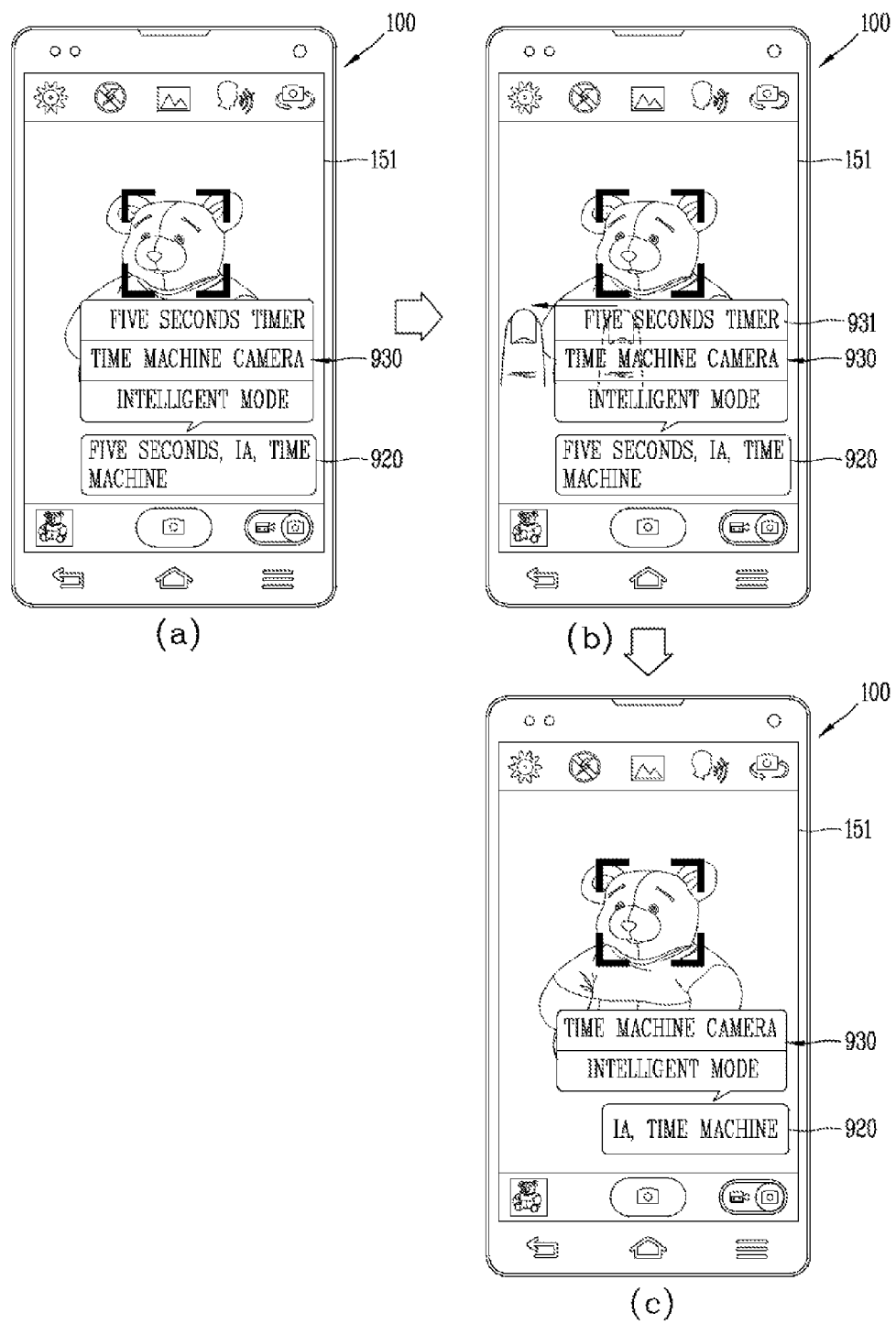

As another example, the image-setting information linked to the already-generated user-defined icon can be edited. As one example, as illustrated in FIG. 8B(a), the controller 180 displays a list 920 including the items of image-setting information corresponding to the user-defined icons. When a predetermined-type touch is applied to one item 931 among items included in the list 930 as illustrated in FIG. 8B(b), the controller 180 performs processing so the image-setting information corresponding to the one item 931 is not linked to the user-defined icon 920 as illustrated in FIG. 8B(c).

Further, the method of editing the image-setting information linked to the user-defined icon can be modified in various ways. As another example, at least one icon among the generated user-defined icons is deleted based on the user's selection. Further, each of the user-defined icons is moved on the display unit 151, based on the user's touch.

Figure 8C:
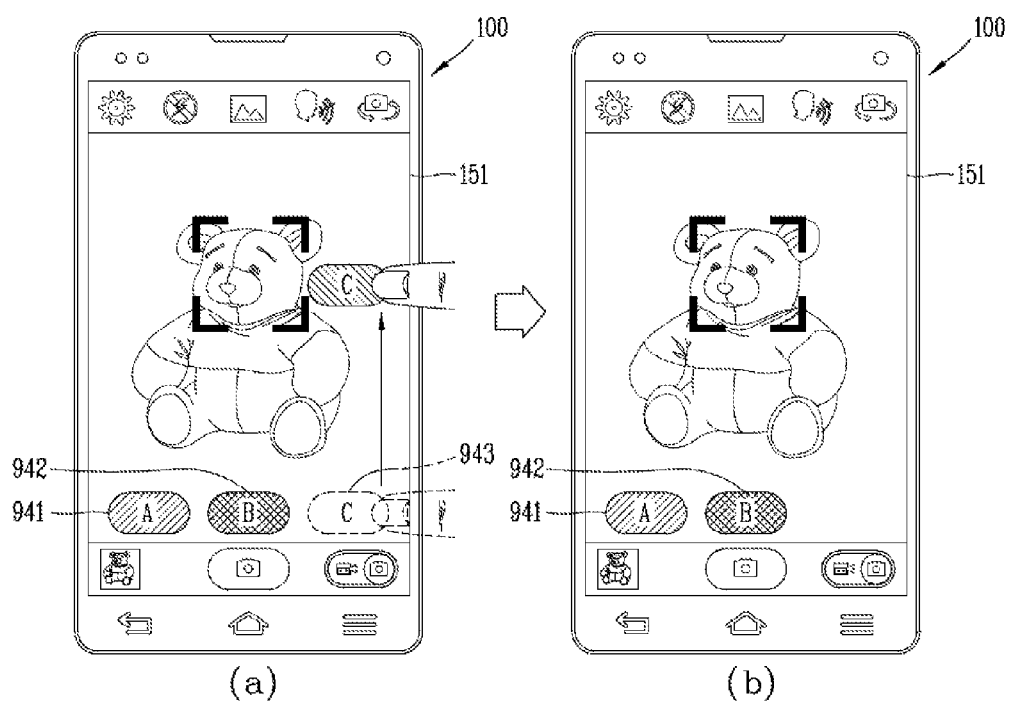
Figure 8D:
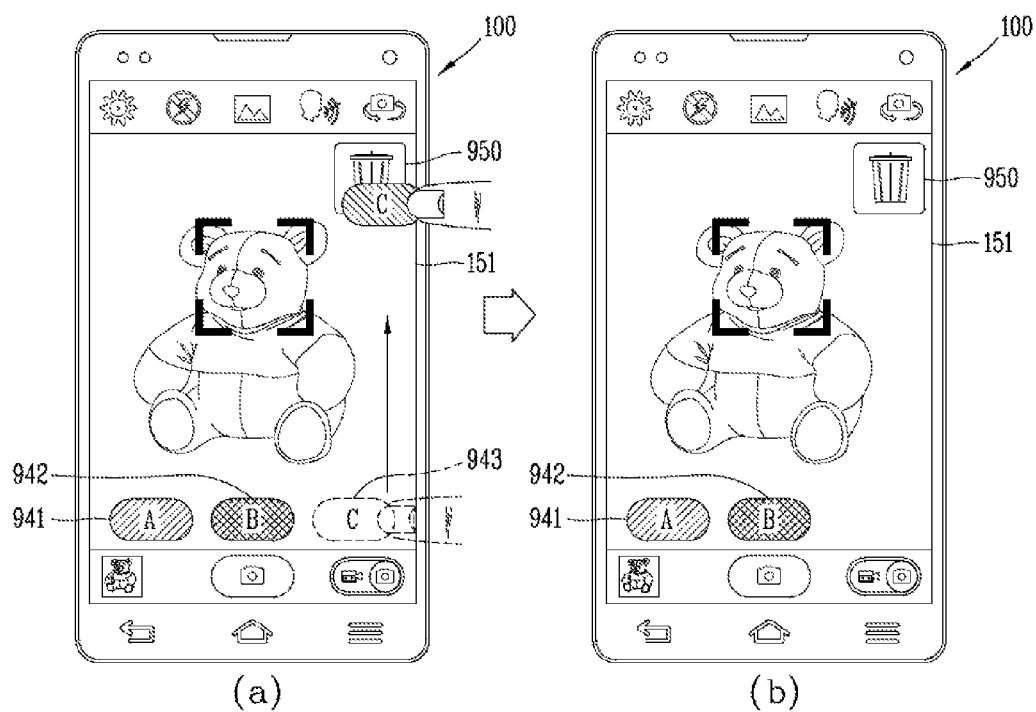

For example, when a specific user-defined icon 943, as illustrated in FIGS. 8C(a) and 8C(b), is moved a predetermined distance or when the specific user-defined icon 943, as illustrated in FIG. 8D(a) and (b), is moved to a graphic object 950 corresponding to a predetermined function, the specific user-defined icon 943 is no longer output on the display unit 151. In this instance, the user-set information linked to the specific icon 943 is also deleted from the memory 160.

In addition, the controller 180 can output some of the user-defined icons among the multiple user-defined icons on the display unit 151. In this instance, a user-defined icon to be output on the display unit 151 is separately selected by the user.

As described above, if the user-defined icon is deleted based on the user's touch applied to the user-defined icon on the display unit 151, the controller 180 enables the user to select whether he/she will output the user-defined icon only on the display unit 151 or delete all items of information relating to the corresponding use-defined icon from the memory 160. Thus, the user environment is optimized for the user by providing the user-defined icon and a function of editing the image-setting information linked to the user-defined icon.

Next, a method is described in detail in which the image capture function is controlled using a voice. In particular, FIGS. 9(*a*) and 9(*b*) are diagrams illustrating a method in which the image capture function is performed using voice in the mobile terminal according to an embodiment of the present invention.

Further, according to an embodiment of the present invention, the voice command is assigned to each of the user-defined icons. Accordingly, based on a recognition of the different voice commands, the controller 180 controls the mobile terminal so the different images are captured. More specifically, the controller 180 recognizes the user's voice received through the microphone other than the touch applied to the user-defined icon, as the request for capturing the image and processes the request for capturing the image.

Figure 9:
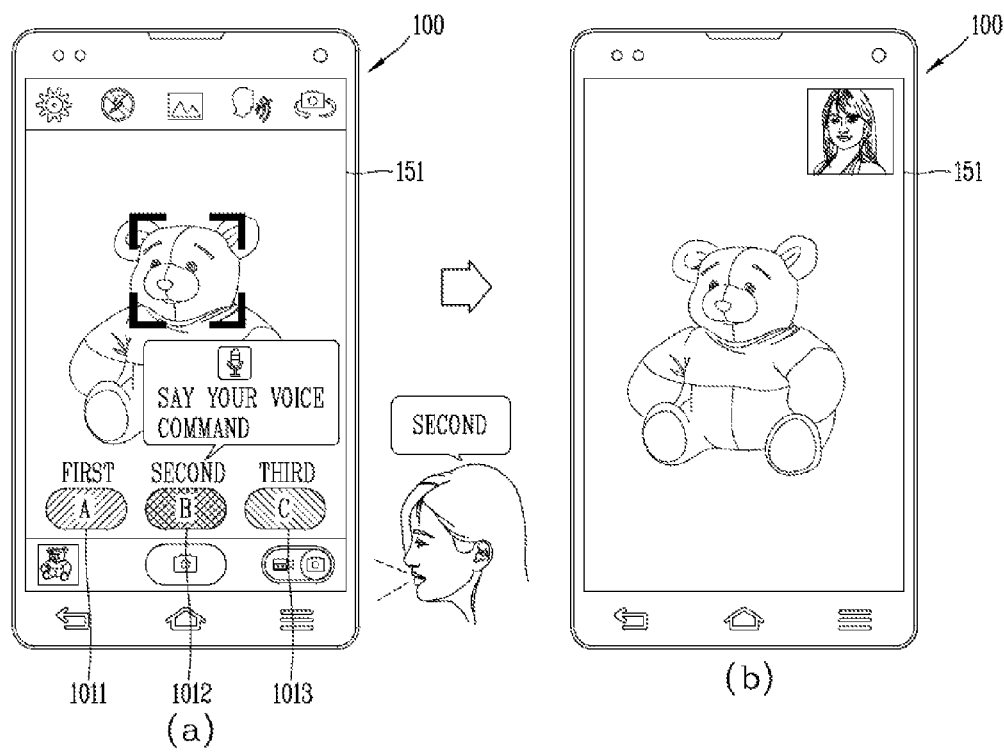
FIG. 9 is a diagram illustrating a method in which an image capture function is performed using voice in the mobile terminal according to an embodiment of the present invention.

Further, the different user-defined icons have different voice commands. The image-setting information corresponding to the image that is obtained is different according to which one of the different voice commands the user's voice received through the microphone corresponds to. Further, to provide the user with information on the voice command assigned to each of the user-defined icons, as illustrated in FIG. 9(*a*), the voice commands corresponding to user-defined icons 1011, 1012, and 1013, respectively, are displayed in the vicinity of the user-defined icons 1011, 1012, and 1013, respectively, in at least one formation among a text format and an image format. Accordingly, as described, when a voice command "second," is input from the user, the controller 180 captures an image corresponding to the input voice command as illustrated in FIG. 9(*b*).

Thus, one image among images corresponding to the different items of image-setting information, respectively, is captured through the voice command, This increases the user convenience.

Next, a method is described in detail below in which the user-defined icon to which the image-setting information is linked is used when capturing a moving image. In particular, FIGS. 10(*a*) to 10(*c*) are diagrams illustrating a method in which the images corresponding to the various items of image-setting information is obtained when capturing the moving image in the mobile terminal according to an embodiment of the present invention.

Figure 10:
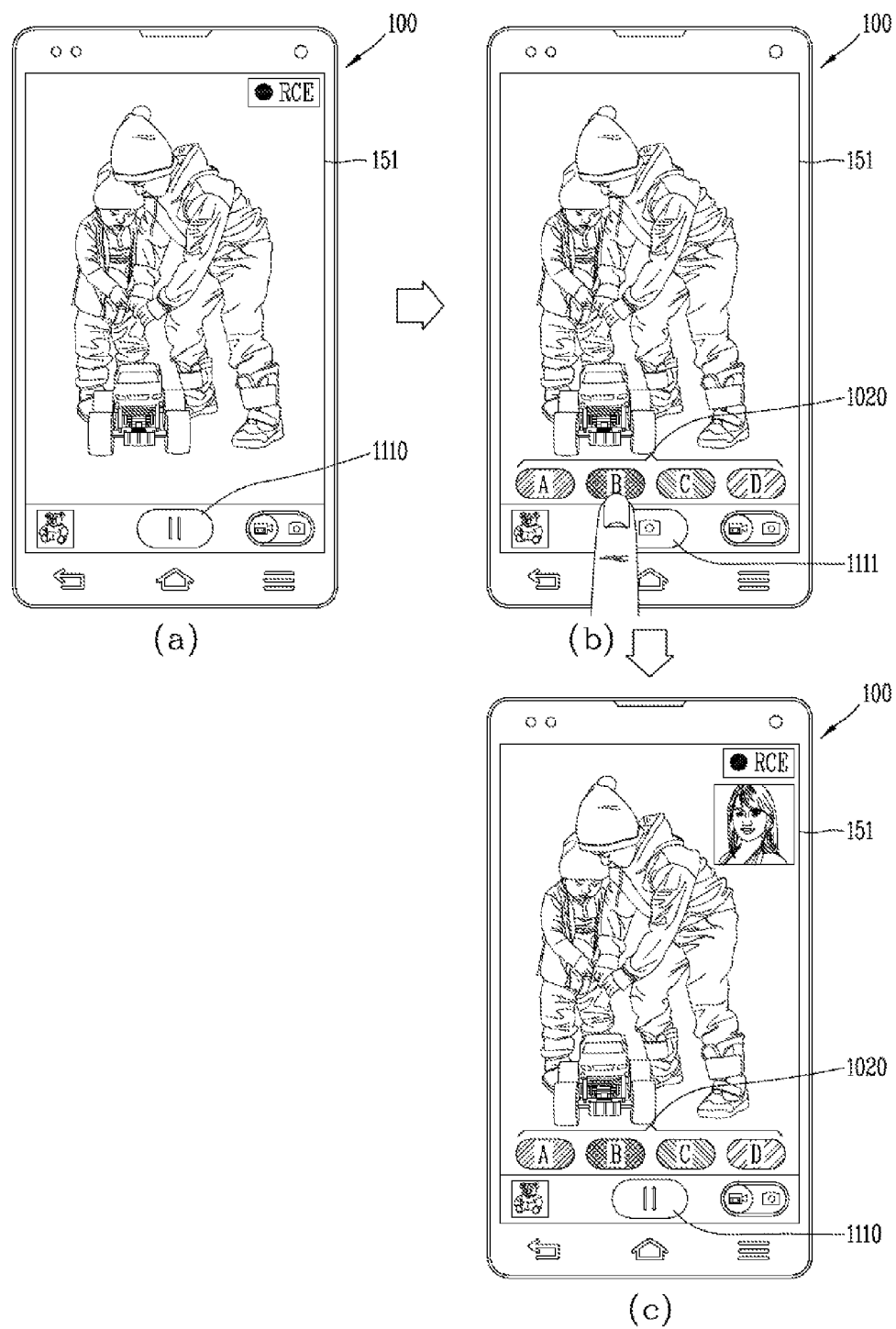
FIGS. 10(a) to 10(c) are diagrams illustrating a method in which images corresponding to the various items of image-setting information is obtained when capturing a moving image in the mobile terminal according to an embodiment of the present invention.

As described above, the mobile terminal according to an embodiment of the present invention and the method of controlling the mobile terminal are applied to capturing of the moving image in the same manner. When capturing the moving image, the user-defined icon is output on the display unit 151 before capturing the moving image or when the capture of the moving image is interrupted. For example, as illustrated in FIG. 10(*a*), when the capture of the moving image is in progress and a capture stop icon 1110 is selected, as illustrated in FIG. 10(*b*), the capture of the moving image, is interrupted and at least one user-defined icon 1020 is output on the display unit 151. Further, the output of the user-defined icon 1020 according to an embodiment is the same as described above and thus a detailed description thereof is omitted.

Thus, when one user-defined icon is selected, the controller 180, as illustrated in FIG. 10(*c*), continues to proceed with the capture of the image in accordance with the image-setting information corresponding to the selected user-defined icon. Further, the moving image is included in the same file as the previously-captured moving image.

In addition, when capturing the moving image, the preview image corresponding to the corresponding user-defined icon is output corresponding to the application of the first touch to the user-defined icon or the maintaining of the application of the touch for an hour. Then, the capture of the moving image is resumed corresponding to the application of the second touch different in type from the first touch to the user-defined icon or the maintaining of the application of the touch to the user-defined icon for a first time different from a second time.

Thus, a user interface is provided in which the image suitable for the user's preference is obtained when capturing the moving image as well as the still image. In addition, the mobile terminal according to one embodiment of the present invention and the method of controlling the mobile terminal provides the user-defined icons to which the different item of image-setting information are linked. Accordingly, the user can obtain the image corresponding to the desired image-setting information only by selecting the user-defined icon.

In addition, the present invention provides the user-defined icon through which the image desired by the user can be captured without inconveniently changing setting values for the camera or setting values for the image whenever capturing the image. Accordingly, the user convenience is improved.

Further, processes that cause the method of controlling the mobile terminal according to an embodiment of the present invention to be performed is programmed, as a basic function of the mobile terminal, into the mobile terminal in the factory at time of manufacturing or are provided in the form of a software application that is downloadable from an external server over a wireless network. Accordingly, if the software application downloaded is installed on the mobile terminal, the software application causes the method of controlling the mobile terminal according to an embodiment of the present invention to be performed on the mobile terminal.

In addition, according to one embodiment, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a camera;
a touch screen; and
a controller configured to:
receive an image signal through the camera,
display, on the touch screen, a preview image corresponding to the image signal and a basic capture icon;
receive, via the touch screen, a first touch input in a state where the preview image and the basic capture icon are displayed on the touch screen;
display, on the touch screen, a plurality of further preview images as further capture icons that apply different image-setting information, respectively, in response to the first touch input,
wherein the plurality of further preview images as the further capture icons is displayed by processing the image signal based on the different image-setting information,
wherein the plurality of further preview images as the further capture icons is displayed with the preview image and the basic capture icon, and
wherein the further capture icons are changed in real time based on the image signal received through the camera,
receive, via the touch screen, a second touch input applied to one of the plurality of further preview images in a state where the preview image, the basic capture icon and the plurality of further preview images as the further capture icons are displayed on the touch screen, and
control the camera to capture an image and process the captured image to apply image-setting information corresponding to the one of the further plurality of preview images to the capture image, in response to the second touch input.

2. The mobile terminal of claim 1, wherein the basic capture icon corresponds to linked basic image-setting information, and
wherein the controller is further configured to:
receive a first or second type of touch applied to the basic capture icon, and
capture the image corresponding to the basic image-setting information when the first type of touch is received or display the plurality of further preview images on the touch screen when the second type of touch is received.

3. The mobile terminal of claim 2, wherein the first type of touch is a short touch applied to the basic capture icon, and the second type of touch is a long touch applied to the basic capture icon.

4. The mobile terminal of claim 3, wherein the controller is further configured to stop displaying the plurality of further preview images after the image is captured.

5. The mobile terminal of claim 1, wherein the controller is further configured to change what image-setting information corresponds to the plurality of further preview images based on a user's selection.

6. The mobile terminal of claim 5, wherein the controller is further configured to:
display items corresponding to multiple setting values on one region of the touch screen, and
edit the image-setting information based on touch inputs applied to corresponding multiple setting values.

7. A method of controlling a mobile terminal, the method comprising:
receiving an image signal through a camera of the mobile terminal;
displaying, on a touch screen of the mobile terminal, a preview image corresponding to the image signal, and a basic capture icon;
receiving, via the touch screen, a first touch input in a state where the preview image and the basic capture icon are displayed on the touch screen;
displaying, via the touch screen, a plurality of further preview images as further capture icons that apply different image-setting information, respectively, in response to the first touch input,
wherein the plurality of further preview images as the further capture icons is displayed by processing the image signal based on the different image-setting information,
wherein the plurality of further preview images as the further capture icons is displayed with the preview image and the basic capture icon, and
wherein the further capture icons are changed in real time based on the image signal received through the camera,
receiving, via the touch screen, a second touch input applied to one of the plurality of further preview images, in a state where the preview image, the basic capture icon and the plurality of further preview images as further capture icons are displayed on the touch screen; and
controlling the camera to capture an image and processing the captured image to apply image-setting information corresponding to the one of the plurality of further preview images to the captured imaged, in response to the second touch input.

8. The method of claim 7, wherein the basic capture icon corresponds to linked basic image-setting information, and
wherein the method further comprises:
receiving, via the controller, a first or second type of touch applied to the basic capture icon; and
capturing, via the controller, the image corresponding to the basic image-setting information when the first type of touch is received or displaying the one of the plurality of further preview images on the touch screen when the second type of touch is received.

9. The method of claim 8, wherein the first type of touch is a short touch applied to the basic capture icon, and the second type of touch is a long touch applied to the basic capture icon.

10. The method of claim 9, further comprising:
stop displaying the plurality of further preview images after the image is captured.

* * * * *